O. JOHNSON AND C. NEUMAN.
TIRE.
APPLICATION FILED NOV. 20, 1920.
1,424,824.
Patented Aug. 8, 1922.
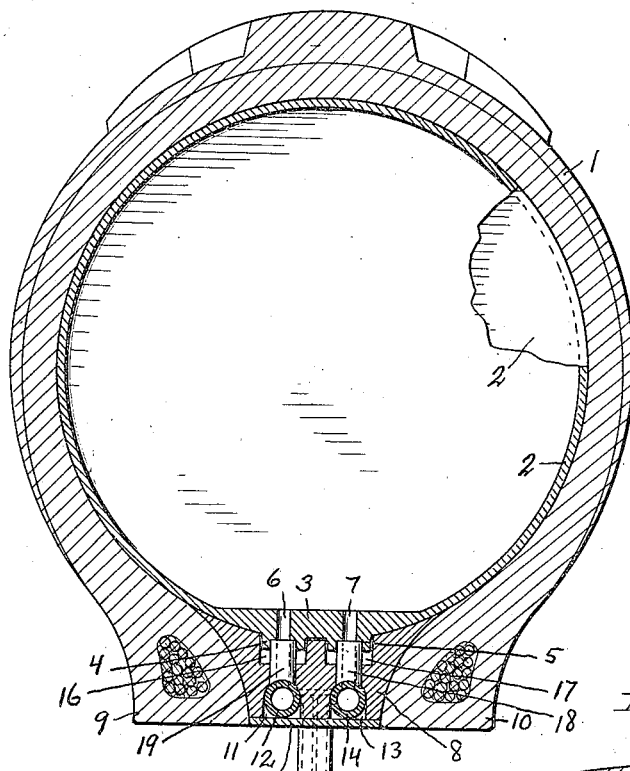
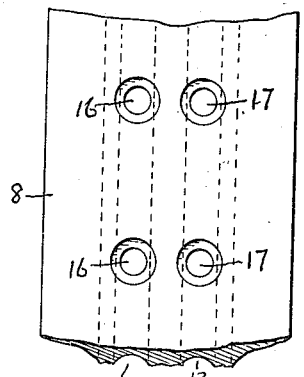
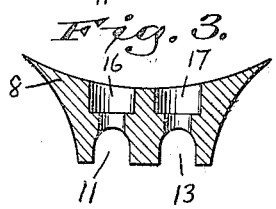
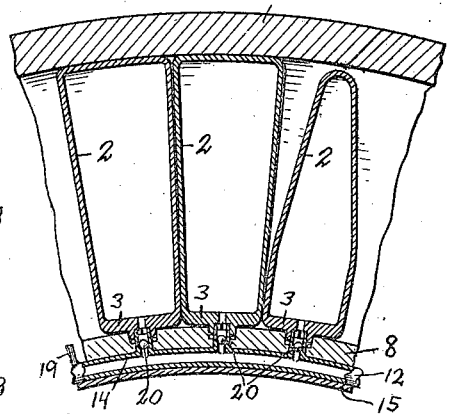
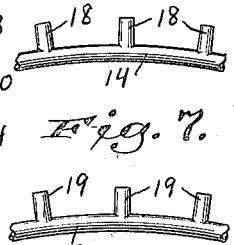
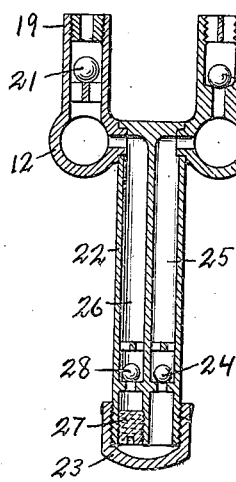
Orin Johnson and Clarence Neuman
INVENTORS,
BY
Bottum Bottum Hudnall & Lecher
ATTORNEYS.

UNITED STATES PATENT OFFICE.

ORIN JOHNSON AND CLARENCE NEUMAN, OF MENASHA, WISCONSIN.

TIRE.

1,424,824.      Specification of Letters Patent.      Patented Aug. 8, 1922.

Application filed November 20, 1920. Serial No. 425,384.

*To all whom it may concern:*

Be it known that we, ORIN JOHNSON and CLARENCE NEUMAN, citizens of the United States, residing at Menasha, in the county of Winnebago and State of Wisconsin, have invented certain new and useful Improvements in Tires, of which the following is a specification, reference being had to the accompanying drawing, forming a part thereof.

This invention relates to tires, and the object of the invention is to improve the construction and operation of pneumatic tires in the manner to be hereinafter described and claimed.

Referring to the drawings which accompany this specification and form a part hereof, which drawings illustrate an embodiment of this invention, and on which drawings the same reference characters are used to designate the same parts wherever they may appear in each of the several views, Fig. 1 is a vertical, transverse section of a tire, a part being broken away; Fig. 2 is a longitudinal, vertical section, on a reduced scale, of part of the tire; Fig. 3 is a sectional elevation of the filling strip; Fig. 4 is a top plan view of part of the filling strip; Fig. 5 is a vertical section, on an enlarged scale, of the air nipple and associated parts; Fig. 6 is an elevation of part of an inflating tube; and Fig. 7 is an elevation of part of a deflating tube.

Referring to the drawings, the reference numeral 1 designates the casing of a pneumatic tire within which are placed a plurality of expansible air bags or cells 2, which are preferably made from rubber of the same general character that is now used for the so-called inner tubes of pneumatic tires. The inner part of each bag or cell 2 is preferably substantially thickened, as indicated by the reference numeral 3, and is provided with nipples 4 and 5 through which apertures 6 and 7 communicate with the inside and outside of the bag or cell. A filling strip 8 is placed between the rim-contacting parts 9 and 10 of the casing 1 and is provided with a groove 11 for a deflating tube 12 and with a groove 13 for an inflating tube 14. The filling strip 8 is illustrated by the drawings as not quite deep or thick enough to reach to the rim-contacting edges of the parts 9 and 10 of the casing 1, and an anti-chafing strip 15 is inserted between the filling strip 8 and the rim of the wheel, not shown. The filling strip 8 is provided with a series of apertures 16 communicating with the groove 11, and with a series of apertures 17 communicating with the groove 13, and the outer parts of the apertures of both series of apertures are enlarged to receive the nipples 4 and 5 on the bags or cells 2. The inner parts of these apertures receive nipples 18 and 19 which project from the inflating tube 14 and the deflating tube 12. It will be noticed from an inspection of Fig. 1 of the drawings that each bag or cell 2 is in communication with both the inflating tube 14 and the deflating tube 12. The nipples 18 of the inflating tube 14 are provided with outwardly closing check valves 20, while the nipples 19 of the deflating tube 12 are provided with inwardly closing check valves 21.

Referring now to Fig. 5 of the drawings, the reference numeral 22 designates an air nipple through which the tire can be inflated, or through which the tire can be deflated. By removing the dust cap 23 and connecting an air hose to the nipple 22, the air under pressure will lift the check valve 24 and pass through the passageway 25 to the inflating tube 14 and, from the inflating tube, will pass by the check valves 20 through the nipples 18 into the several bags or cells 2, thereby inflating each and all of the bags or cells 2. Each of the bags or cells 2 will also be in communication with the deflating tube 12 through the nipples 19, so that the air pressure will be equalized throughout the tire. The number of bags or cells 2 to be used will depend on the size of the casing 1, the only material point to be observed is to have them sufficiently large or sufficiently dilatable so that, in case of a puncture, the unpunctured bags or cells can expand to fill the space within the casing so that the tire will be inflated at all times. The deflating tube 12 is in communication with a passageway 26 in the air nipple 22 and this passageway is closed by a removable plug 27, which can be removed to deflate the tire, but which, when in place, does not interfere with inflating the tire with air. A check valve 28 prevents the escape of air from the deflating tube 12 except when it is purposely pushed from its seat for deflating the tire.

The object of the construction is to avoid having a tire put out of commission by a puncture. Suppose, for example, that the casing 1 and an air bag or cell 2 is punctured. The only air lost is the air in that one cell. The other cells immediately expand to fill the casing. The air pressure in the tire is only reduced in the proportion that one cell full of air bears to all the air in the other cells. If only a single cell were punctured, the loss of air pressure would not be noticed if the total number of cells was large. It is to be understood, of course, that the cells or bags are sufficient in number and size to entirely fill the casing when expanded with air, even though one or more of the cells or bags should be punctured. When a bag or cell is punctured, the air in the inflating tube 14 will raise its check valve 20 and escape, but the air in every other cell or bag will close its check valve 20 towards the inflating tube 14, thereby preventing the escape of air from unpunctured bags or cells. The bags or cells are, however, all in communication with the deflating tube 12, but the check valves 21 close towards the bags or cells and away from the deflating tube 12, so that the check valve 21 for the punctured bag or cell will close and prevent air entering that bag or cell from the deflating tube 12 and the other bags or cells.

The air nipple 22 is made as a single member with two separate passageways to accommodate the tire to the existing wheels of vehicles.

What is claimed is:

1. In a tire the combination with a plurality of cells of an inflating tube and a deflating tube connected with each cell, outwardly closing check valves controlling the communication between the cells and the inflating tube, inwardly closing check valves controlling the communication between the cells and the deflating tube, an air nipple provided with separate passageways communicating with said tubes, check valves for said passageways, and means for closing the passageway communicating with the deflating tube.

2. In a tire, the combination with a casing of a plurality of cells, a filling strip, provided with grooves and apertures, an inflating tube and a deflating tube disposed within the grooves of the filling strip and communicating with the cells through nipples received within the apertures, and means to prevent air from passing from an unpunctured cell to a punctured cell.

In witness whereof we hereto affix our signatures.

ORIN JOHNSON.
CLARENCE NEUMAN.